(12) United States Patent
Viol

(10) Patent No.: US 7,785,045 B2
(45) Date of Patent: Aug. 31, 2010

(54) INSERT WITH A MOUNTING HOLE AND TOOLHOLDER INCLUDING A CUTTING INSERT

(75) Inventor: Kent Viol, Arbogo (SE)

(73) Assignee: Seco Tools AB, Fagersta (SE)

( * ) Notice: Subject to any disclaimer, the term of this patent is extended or adjusted under 35 U.S.C. 154(b) by 306 days.

(21) Appl. No.: 11/671,242

(22) Filed: Feb. 5, 2007

(65) Prior Publication Data

US 2007/0189862 A1    Aug. 16, 2007

(30) Foreign Application Priority Data

Feb. 15, 2006    (SE) .................................. 0600337

(51) Int. Cl.
   *B23B 27/16*    (2006.01)
(52) U.S. Cl. ...................... 407/101; 407/107
(58) Field of Classification Search ......... 407/101–104, 407/107, 113; *B23B 27/16*
   See application file for complete search history.

(56) References Cited

U.S. PATENT DOCUMENTS

| 5,836,723 | A | * | 11/1998 | Von Haas et al. ........... 407/107 |
| 6,050,751 | A | * | 4/2000 | Hellstrom .................... 407/104 |
| 6,158,928 | A | * | 12/2000 | Hecht ........................ 407/102 |
| 7,094,006 | B2 | * | 8/2006 | Hecht ........................ 407/102 |
| 2003/0086766 | A1 | * | 5/2003 | Andras ....................... 407/102 |
| 2003/0143040 | A1 | | 7/2003 | Jansson |
| 2005/0152754 | A1 | * | 7/2005 | Wiman et al. ............... 407/103 |
| 2005/0186039 | A1 | * | 8/2005 | Muller et al. ............... 407/113 |
| 2007/0245535 | A1 | * | 10/2007 | Noggle ....................... 29/428 |
| 2008/0193233 | A1 | * | 8/2008 | Park .......................... 407/104 |

FOREIGN PATENT DOCUMENTS

| DE | 2034993 | A | | 1/1972 |
| DE | 3301191 | A1 | * | 7/1984 |
| JP | 08066804 | A | * | 3/1996 |
| JP | 09108909 | A | * | 4/1997 |
| JP | 2004167635 | A | | 6/2004 |
| JP | 2006247790 | A | * | 9/2006 |
| JP | 2006263856 | A | * | 10/2006 |
| SE | 0487478 | A1 | | 5/1992 |
| WO | WO 9005608 | A1 | * | 5/1990 |
| WO | WO 9727018 | A1 | * | 7/1997 |

OTHER PUBLICATIONS

International Search Report from corresponding International Application PCT/SE2007/050005.

* cited by examiner

*Primary Examiner*—Boyer D Ashley
*Assistant Examiner*—Sara Addisu
(74) *Attorney, Agent, or Firm*—WRB-IP LLP

(57) ABSTRACT

The present invention relates to cutting tools with cutting inserts and, more particularly, to cutting tools with cutting inserts that have mounting recesses. The cutting insert includes a body having a mounting hole having an axis extending therethrough, and a surface portion in the mounting hole. The surface portion is substantially circular when viewed in a direction of the axis and is non-parallel to the axis and including at least two contact points disposed at a lesser distance from the axis than a region between the at least two contact points. A cutting tool is also disclosed.

18 Claims, 4 Drawing Sheets

INSERT WITH A MOUNTING HOLE AND TOOLHOLDER INCLUDING A CUTTING INSERT

The present invention relates to cutting tools with cutting inserts and, more particularly, to cutting tools with cutting inserts that have mounting recesses.

In cutting tools that use replaceable or indexable cutting inserts, it is very important that the cutting inserts be able to be mounted on toolholders in a consistent fashion so that the working cutting edges of the insert are disposed at a desired location relative to the rest of the tool. It is also important that, once mounted on a toolholder, the cutting inserts do not tend to move relative to the toolholder. Imprecise mounting or movement of inserts relative to toolholders can damage expensive workpieces.

Tool designers make every effort to precisely form and machine inserts and toolholders, and to minimize the tendency of inserts to move relative to toolholders. To date, most efforts have focused on precisely forming contacting exterior surfaces of the insert and the toolholder recess. It is desirable to improve the stability of an insert to toolholder mounting.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
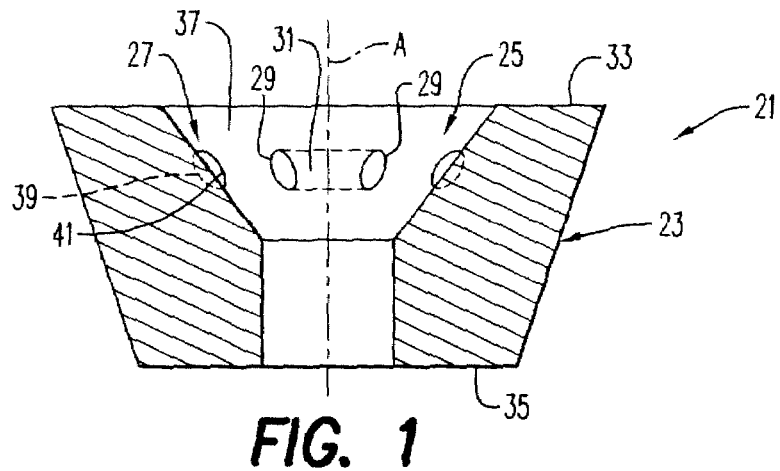
FIG. 1 is a side, cross-sectional view of a cutting insert according to an embodiment of the present invention.
Figure 2:
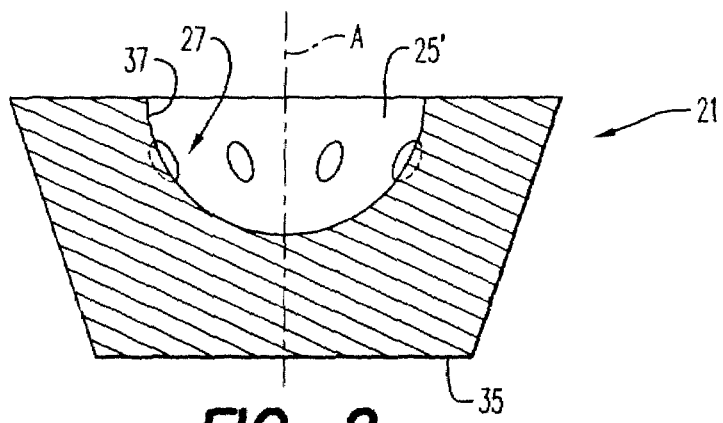
FIG. 2 is a side, cross-sectional view of a cutting insert according to another embodiment of the present invention.

A cutting insert 21 according to an embodiment of the present invention is seen in FIG. 1. The cutting insert 21 comprises a body 23 having a mounting hole 25 having an axis A extending therethrough. The mounting hole 25 comprises at least one contact region 27 comprising at least two contact points 29 disposed at a lesser distance from the central axis than a region 31 between the at least two contact points. The contact region 27 is arranged along a surface portion 37, i.e., on or offset from the surface portion. The surface portion 37 may be frustoconical as seen in FIG. 1 or some other shape, such as semi-spherical as shown in FIG. 2 and is substantially circular when viewed in a direction of the axis. The surface portion 37 on which the contact points 29 are arranged is non-parallel to the axis A of the mounting hole 25 and non-parallel to a plane perpendicular to the axis. The surface portion 37 may, of course, be a portion of a larger surface, part of which larger surface may be parallel to or perpendicular to the axis A, i.e., such as a top end of the semi-spherical shape shown in FIG. 2, although the failure to refer to other surfaces as surface portions is not meant to indicate that those surface cannot be portions of larger surfaces.

Figure 3:
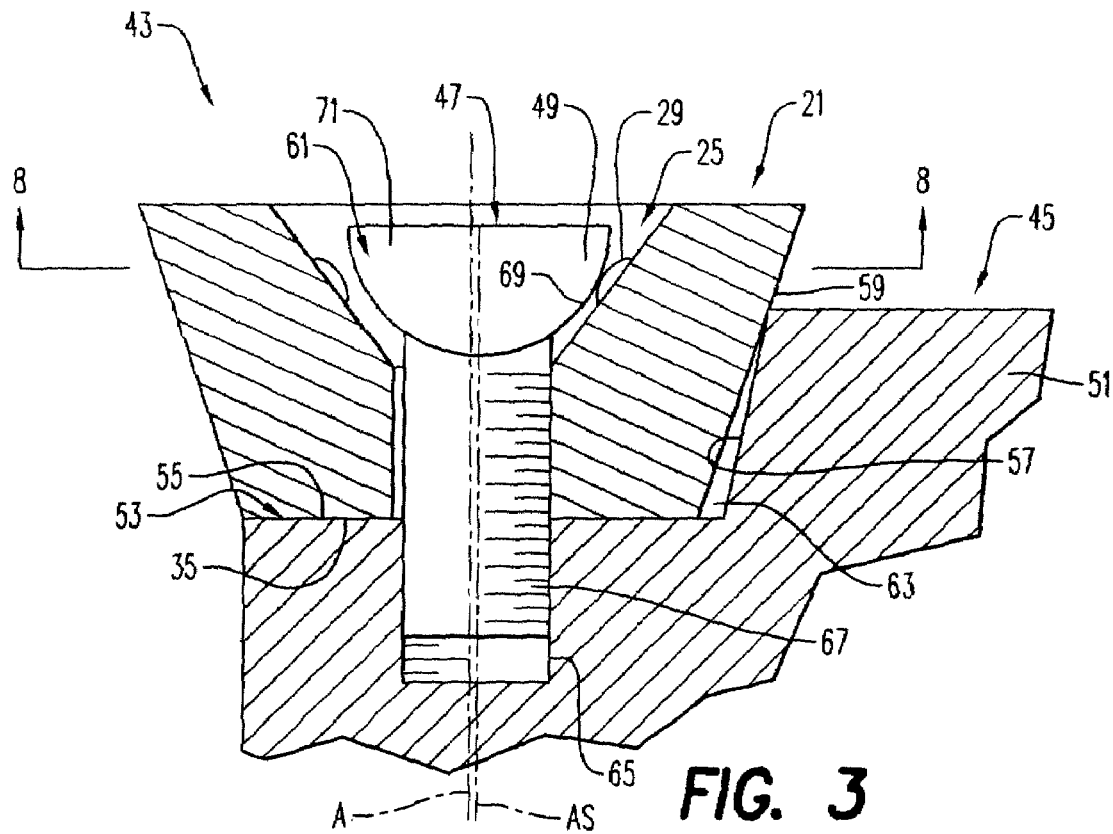
FIG. 3 is a side, partially cross-sectional view of a portion of a cutting tool according to an embodiment of the present invention.
Figure 4:
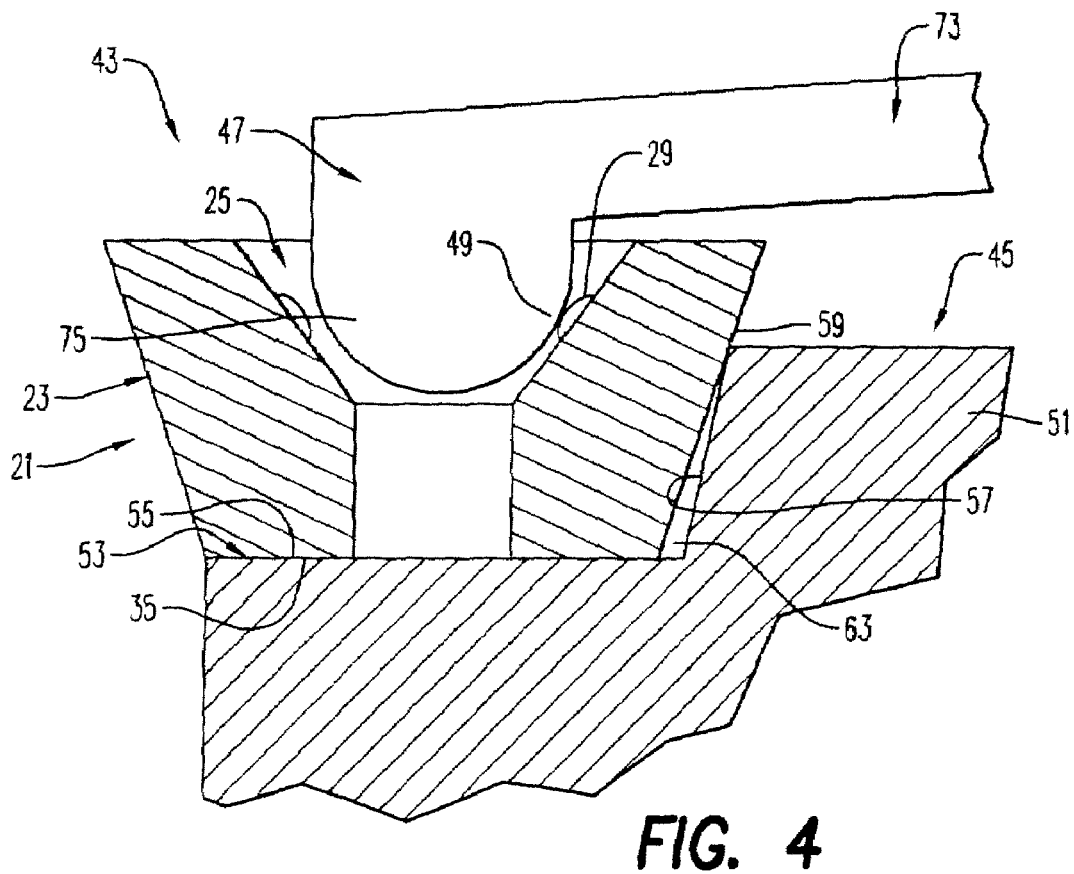
FIG. 4 is a side, partially cross-sectional view of a portion of a cutting tool according to another embodiment of the present invention.

The mounting hole 25 can extend entirely through the insert 21 as seen in FIG. 1 or a mounting hole 25' can comprise a recess that does not extend entirely through the insert as seen in FIG. 2. The mounting hole 25 can be used to secure the insert 21 relative to a toolholder 45 as seen in FIGS. 3 and 4, such as by securing the insert with, for example, a clamp 47 such as a screw 61 (FIG. 3) or pin that extends partially or entirely through a hole extending through the insert, or by a clamping arm 73 (FIG. 4) that contacts a top of the insert and has a nose 75 that is partially disposed in a hole that extends partially or entirely through the insert, or by any other suitable approach. A portion of the nose 75 that contacts the contact points 29 will ordinarily be curved or circularly cylindrical along an axis of the nose extending substantially parallel to the axis A so that the nose contacts the contact points in substantially the same fashion as a circular screw head; however, contacting portions of the nose may be other shapes, such as comprising one or more flat or curved surface.

The cutting insert 21 can be indexable relative to a toolholder between a plurality of positions although, of course, the cutting insert may instead be mountable relative to the toolholder in only a single position. Ordinarily, the mounting hole 25 will have a plurality of contact points 29, the number of contact points usually being equal to two times the number of positions to which the cutting insert is indexable. The contact points 29 will ordinarily be formed to facilitate manufacture using conventional pressing and sintering techniques and, ordinarily, no portion of any contact point will be disposed radially outward of a portion of the contact point vertically above the portion so that press components for forming the mounting hole 25 can be easily withdrawn. Of course, more complicated shapes can be formed using more complicated pressing components.

Figure 5:
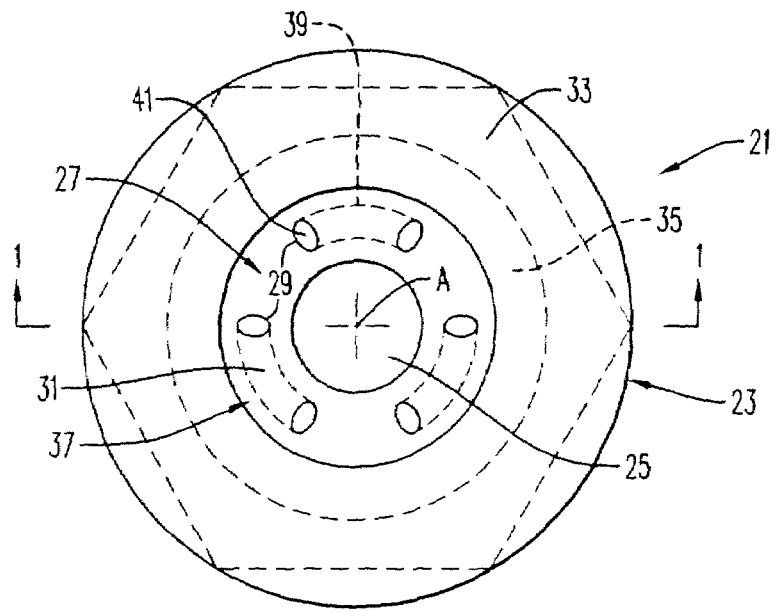
FIG. 5 is a top view of the insert of FIG. 1.

As seen in FIG. 5, the mounting hole 25 may be substantially circular when viewed along the axis A. The axis A may be a central axis and may extend from a top surface 33 to a bottom surface 35 of the insert through a line or point of rotational symmetry of the insert although other, non-central axes may be provided.

Figure 6:
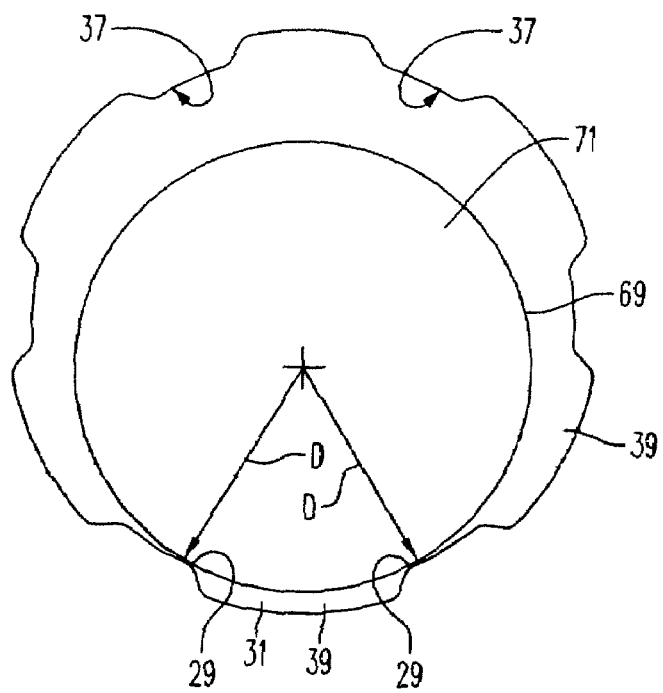
FIGS. 6-7 are schematic views of points of contact between a clamp and contact points in a mounting hole of a cutting insert according to different embodiments of the present invention.
Figure 7:
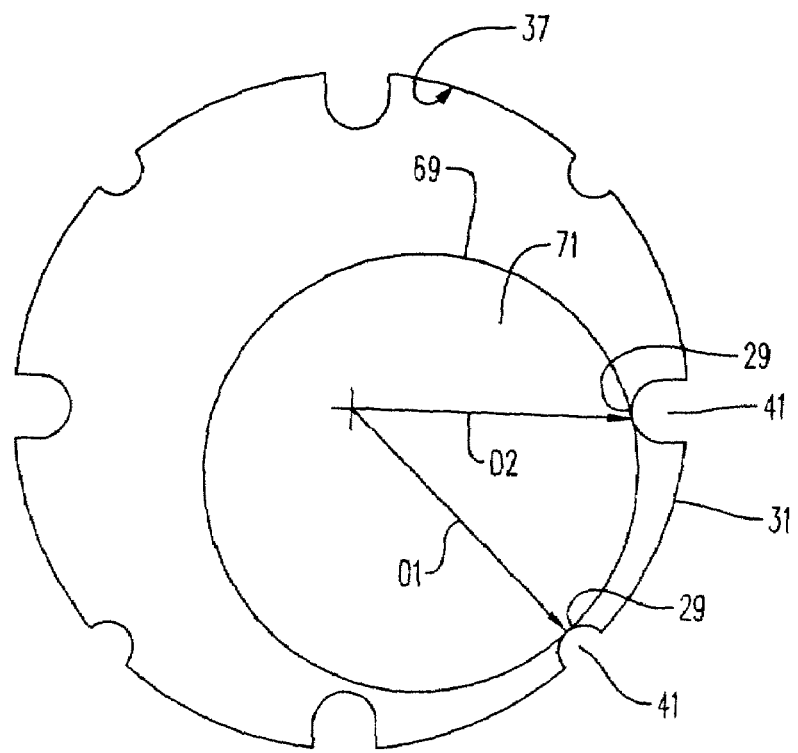

As seen in FIG. 6, the at least two contact points 29 are ordinarily disposed at substantially the same distance D from the central axis A. It is, however, also possible to provide the at least two contact points 29 such that they are disposed at different distances D1 and D2 from the central axis A, such as shown in FIG. 7.

FIG. 6 shows an insert 21 wherein the mounting hole 25 comprises a surface portion 37 and the region 31 between the at least two contact points 29 comprises a recess 39 in the surface portion. The mounting hole 25 may, however, comprise a surface portion 37 and the at least two contact points 29 may comprise protrusions 41 from the surface portion as seen in FIGS. 1-5, 7 and 8. Ordinarily, as seen in FIG. 5, neither protrusions 41 nor recesses 39 (shown in phantom) extend the length of the surface portion 37 in a direction of an axis A of the mounting hole 25. While an insert will typically have either recesses 39 in the surface portion 37 or protrusions 41 from the surface portion, it is also possible to have both recesses in and protrusions from the surface portion (not shown). Typically, the two contact points 29 are adjacent or substantially adjacent the recess 39, although the size of the mounting screw, pin, or arm can have an impact on the location of the contact points.

Figure 8:
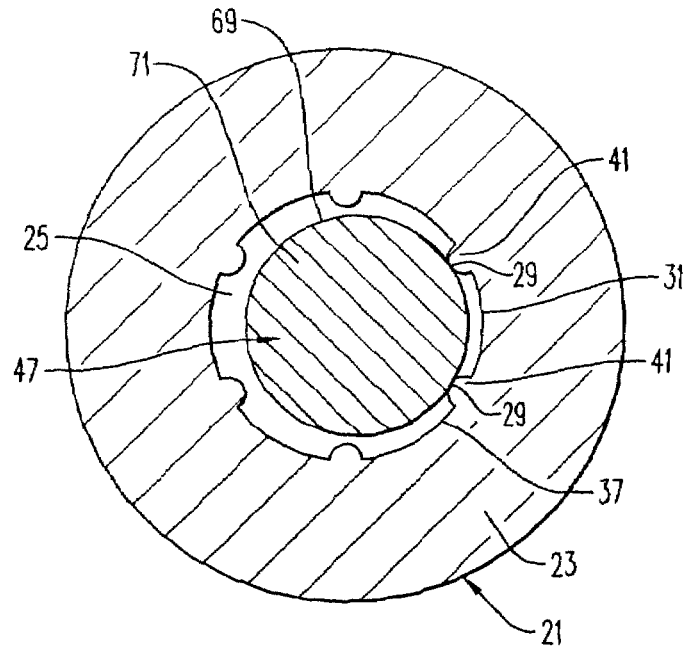
FIG. 8 is a cross-sectional view of part of the cutting tool of FIG. 3.

The body 23 can be of any desired shape, such as generally circular in shape (when viewed along the axis A) as shown in FIGS. 5 and 8, square, rectangular, triangular, trigonal, etc. For example, FIG. 5 shows, in phantom, a hexagonal insert shape. The use of contact points 29 separated by a region 31 is presently believed to be particularly useful in securing circular inserts 21 relative to a toolholder in a manner that substantially prevents rotation of the insert about the axis A or pivoting of the insert relative to a mounting screw or clamping arm. The use of contact points 29 separated by a region 31 is presently believed to be useful in providing a highly stable form of mounting arrangement. In addition, the contact points 29 and separating region 31 facilitate proper indexing of the insert 21, particularly when the insert is a circular insert such as shown in FIGS. 5 and 8.

A cutting tool 43 according to an embodiment of the present invention is shown in FIGS. 3 and 4. The cutting tool 43 comprises a cutting insert 21 as shown in FIG. 1 comprising an insert body 23 having a mounting hole 25 having an axis A extending therethrough, and at least one contact region 27 comprising at least two contact points 29 disposed at a lesser distance from the axis A than a region 31 between the at least two contact points in the mounting hole. The cutting tool 43 also comprises a toolholder 45 and a clamp 47 having a portion 49 disposed in the mounting hole 25 for contacting the at least two contact points 29 and securing the cutting insert 21 relative to the toolholder.

In the cutting tool 43, the toolholder 45 comprises a body 51 and one or more recesses 53 in the body for receiving the insert 21. The recess 53 typically comprises a bottom surface 55, which is typically either formed directly in the body 51 of the toolholder 45 or a shim (not shown) that is secured to a surface on the body. The recess 53 typically also comprises one or more sidewalls 57 extending upwardly from the bottom surface 55. The sidewalls 57 typically define an obtuse angle with the bottom surface 55 of the recess 53. The insert 21 typically also comprises sidewalls 59 that define an obtuse angle with the bottom surface 35 of the insert. The angle between the bottom surface 35 of the insert 21 and the sidewalls 59 of the insert is typically equal to or greater than the angle between the bottom surface 55 of the recess 53 and the sidewalls 57 of the recess. When the insert 21 and the recess 53 are shaped as such, when the insert is positioned in the recess in a manner such that the sidewalls 59 of the insert abut the sidewalls 57 of the recess, a small space 63 (shown in greatly exaggerated form in FIGS. 3 and 4) is defined between the insert and recess sidewalls proximate the bottom surface 35 of the insert. This ensures that corners of the insert and the recess will not interfere with the proper seating of the insert. Other solutions to this problem can include providing a chamfer or recessed portion at the bottom of the insert or machining a groove at the intersection of the sidewalls and the bottom of the recess. An area of contact between the sidewalls 57 of the recess 53 and the sidewalls 59 of the insert 21 can be along a line or over an area where the angle of the recess sidewalls match the angle of the insert sidewalls.

Typically, a clamp 47 such as a screw 61 as shown in FIG. 3 is caused to mate with a threaded hole 65 in the bottom surface 55 of the recess 53. The threaded hole 65 is ordinarily formed in the bottom surface 55 of the recess 53 in a location such that, when the threaded shaft 67 of the screw is inserted through the mounting hole 25 in the insert 21 and screwed into the threaded hole 65, there is a slight offset of a longitudinal axis AS of the threaded shaft 67 of the screw in a direction toward the sidewalls 57 of the recess 53 from the location of the axis A of the mounting hole. Nonetheless, the bottom surface 35 of the insert 21 and the bottom surface 55 of the recess 53 (both of which are typically flat) can be caused to lie flat against one another.

As the screw 61 is screwed further into the threaded hole 65, a side surface 69 of the head 71 of the screw, which is often provided with a convex shape, contacts the contact points 29 (seen in FIGS. 3 and 8) closest to the side surface 57 of the recess 53 and urges bottom and side surfaces of the insert 21 into more complete contact with the bottom and side surfaces of the recess. As the insert 21 is forced down more under the force applied by the clamp 47, e.g., the screw 61, the bottom surface 35 of the insert is forced down against the bottom surface 55 of the recess and gaps between the sloped sidewalls 57 of the recess and the sidewalls of the insert 59 are reduced.

By providing an insert 21 with a mounting hole 25 with a contact region 27 having two contact points 29 on opposite sides of a region 31 between the contact points, two points, lines, or areas of contact can be provided between the clamp 47 such as a screw and the contact points. These two points, lines, or areas of contact can reduce a tendency of the insert to move about either of those points as compared with a conventional insert and toolholder recess arrangement wherein a circular (in cross-section) side surface of the head of the screw contacts a circular (in cross-section) surface portion of the mounting hole substantially at a single point, line, or area. By providing the contact points 29 on a frustoconical contact region 27 of the mounting hole 25, forces on the contact points can tend to force the insert 21 against the sidewall(s) 57 of the recess 53 and against the bottom surface 55 of the recess. In addition, the contact points 29 can facilitate proper indexing of inserts to expose different portions of the cutting edge of the insert to a workpiece.

Figure 9A:
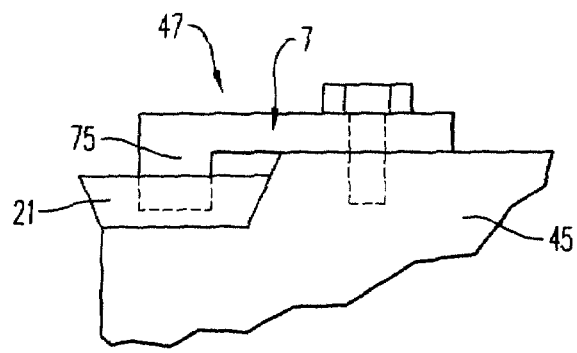
FIGS. 9A and 9B are partial views of cutting tools according to embodiments of the present invention.
Figure 9B:
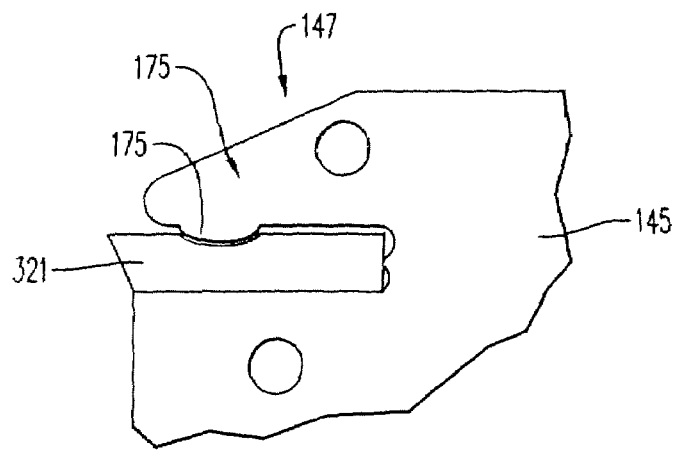

The clamp 47 may comprise a screw 61 having a threaded shaft 67 that extends through the mounting hole 25 and a head 71. Other suitable forms of clamps comprise a clamping arm 73 comprising a forward nose portion 75 that extends into the mounting hole 25 as seen in FIG. 4. The clamping arm 73 may be attachable to the toolholder 45 as seen in FIG. 9A or may be a clamp 147 in the form of a clamping arm 173 and forward nose portion 175 that is an integral part of a toolholder 145 as seen in FIG. 9B, such as is common particularly in grooving or cut-off type inserts 321. It will be appreciated that a mounting hole in the sense used in the present application is not limited to holes with perimeter surfaces surrounding the axis of the hole and may comprise holes in the sense of a depression (relative to some higher surface or point) such as is provided in the insert 321. The surface portion with the contact points in the hole in the insert 321 can be substantially circular when viewed in a direction of the axis of the hole, in the sense that the surface portion defines at least an arc of a substantially circular shape. While the surface portion is substantially circular, the mounting hole need not be substantially circular although, in the embodiments shown in FIGS. 5-8, the mounting hole is circular. The mounting hole may be elliptical, oval, or have some other suitable shape. The cutting insert 21, 321 may comprise a body 23 having a mounting hole 25 having an axis A extending therethrough, and a surface portion 37 in the mounting hole 25, the surface portion being substantially circular when viewed in a direction of the axis A and defining a non-zero angle with the axis and comprising at least two contact points 29 arranged along the surface portion and disposed at a lesser distance from the axis than a region 31 between the at least two contact points, at least one of the at least two contact points and the region between the at least two contact points being offset from the surface portion.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The invention claimed is:

1. A cutting insert, comprising:
   a body having a mounting hole having an axis extending therethrough; and
   a surface portion in the mounting hole, wherein the surface portion is substantially entirely circular when viewed in a direction of the axis and the substantially entirely circular surface portion is also substantially entirely non-parallel to the axis and comprises at least two contact points disposed at a lesser distance from the axis than a region between the at least two contact points, wherein the at least two contact points comprise protrusions from the surface portion.

2. The cutting insert as set forth in claim 1, wherein the cutting insert is indexable between a plurality of positions.

3. The cutting insert as set forth in claim 2, comprising a plurality of contact points, a number of contact points corresponding to two times a number of positions to which the cutting insert is indexable.

4. The cutting insert as set forth in claim 1, comprising a plurality of contact points, a number of contact points corresponding to two times a number of positions to which the cutting insert is indexable.

5. The cutting insert as set forth in claim 1, wherein the mounting hole is substantially circular.

6. The cutting insert as set forth in claim 5, wherein the axis is a central axis.

7. The cutting insert as set forth in claim 6, wherein the at least two contact points are disposed at substantially the same distance from the central axis.

8. The cutting insert as set forth in claim 6, wherein the at least two contact points are disposed at different distances from the central axis.

9. The cutting insert as set forth in claim 1, wherein the at least two contact points are disposed at substantially the same distance from the axis.

10. The cutting insert as set forth in claim 1, wherein the at least two contact points are disposed at different distances from the axis.

11. The cutting insert as set forth in claim 1, wherein the body is generally circular in shape.

12. The cutting insert as set forth in claim 1, wherein the mounting hole is a through hole extending from one side of the insert to another.

13. A cutting insert, comprising:
   a body having a mounting hole having an axis extending therethrough; and
   a surface portion in the mounting hole, wherein the surface portion is substantially entirely circular when viewed in a direction of the axis and the substantially entirely circular surface portion is also substantially entirely non-parallel to the axis and comprises at least two contact points disposed at a lesser distance from the axis than a region between the at least two contact points, wherein the region between the at least two contact points comprises a recess in the surface portion, the recess extending for less than a length of the surface portion.

14. A cutting tool, comprising:
   a cutting insert comprising an insert body having a mounting hole having an axis extending therethrough, and a surface portion in the mounting hole,
   a toolholder; and
   a clamp for securing the cutting insert relative to the toolholder,
   wherein the surface portion is substantially entirely circular when viewed in a direction of the axis and the substantially entirely circular surface portion is also substantially entirely non-parallel to the axis and comprises at least two contact points disposed at a lesser distance from the axis than a region between the at least two contact points and the clamp has a portion disposed in the mounting hole for contacting the at least two contact points and securing the cutting insert relative to the toolholder, wherein the at least two contact points comprise protrusions from the surface portion.

15. The cutting tool as set forth in claim 14, wherein the clamp comprises a screw that extends through the mounting hole.

16. The cutting tool as set forth in claim 14, wherein the clamp comprises a clamping arm comprising a forward nose portion that extends into the mounting hole.

17. The cutting tool as set forth in claim 16, wherein the clamping arm is attachable to the toolholder.

18. A cutting tool, comprising:
   a cutting insert comprising an insert body having a mounting hole having an axis extending therethrough, and a surface portion in the mounting hole,
   a toolholder; and
   a clamp for securing the cutting insert relative to the toolholder,
   wherein the surface portion is substantially entirely circular when viewed in a direction of the axis and the substantially entirely circular surface portion is also substantially entirely non-parallel to the axis and comprises at least two contact points disposed at a lesser distance from the axis than a region between the at least two contact points and the clamp has a portion disposed in the mounting hole for contacting the at least two contact points and securing the cutting insert relative to the toolholder, wherein the region between the at least two contact points comprises a recess in the surface portion, the recess extending for less than a length of the surface portion.

* * * * *